US008736836B2

(12) United States Patent
Chrisp et al.

(10) Patent No.: US 8,736,836 B2
(45) Date of Patent: May 27, 2014

(54) ECHELLE GRATING MULTI-ORDER IMAGING SPECTROMETER UTILIZING A CATADIOPTRIC LENS

(75) Inventors: Michael P. Chrisp, Lexington, MA (US); Joel M. Bowers, Livermore, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 539 days.

(21) Appl. No.: 13/086,233

(22) Filed: Apr. 13, 2011

(65) Prior Publication Data

US 2012/0062889 A1 Mar. 15, 2012

Related U.S. Application Data

(60) Provisional application No. 61/382,377, filed on Sep. 13, 2010.

(51) Int. Cl.
*G01J 3/02* (2006.01)
*G01J 3/18* (2006.01)

(52) U.S. Cl.
CPC ............ *G01J 3/0208* (2013.01); *G01J 3/1809* (2013.01); *G01J 3/0286* (2013.01)
USPC ........................................................ 356/328

(58) Field of Classification Search
CPC ......... G01J 3/2823; G01J 3/0208; G01J 3/02; G01J 3/1809; G01J 3/189; G01J 3/0286; G02B 5/1814
USPC ................................................. 356/326–328
See application file for complete search history.

(56) References Cited

U.S. PATENT DOCUMENTS

| 5,565,983 | A | * | 10/1996 | Barnard ........................ 356/328 |
| 5,717,487 | A | | 2/1998 | Davies |
| 6,078,048 | A | * | 6/2000 | Stevens et al. ........... 250/339.02 |
| 6,100,974 | A | | 8/2000 | Reininger |
| 6,151,112 | A | | 11/2000 | Atkinson et al. |
| 6,538,737 | B2 | | 3/2003 | Sandstrom et al. |
| 6,713,770 | B2 | | 3/2004 | Sandstrom et al. |
| 7,016,037 | B2 | | 3/2006 | Chrisp et al. |
| 2005/0041247 | A1 | * | 2/2005 | Lerner et al. .................. 356/328 |
| 2005/0073680 | A1 | * | 4/2005 | Chrisp et al. .................. 356/328 |
| 2007/0171415 | A1 | * | 7/2007 | Chrisp .......................... 356/328 |
| 2012/0002202 | A1 | * | 1/2012 | Chrisp .......................... 356/328 |

FOREIGN PATENT DOCUMENTS

EP 1 260 802 A1 11/2002

* cited by examiner

*Primary Examiner* — Kara E Geisel
(74) *Attorney, Agent, or Firm* — Eddie E. Scott

(57) ABSTRACT

A cryogenically cooled imaging spectrometer that includes a spectrometer housing having a first side and a second side opposite the first side. An entrance slit is on the first side of the spectrometer housing and directs light to a cross-disperser grating. An echelle immersions grating and a catadioptric lens are positioned in the housing to receive the light. A cryogenically cooled detector is located in the housing on the second side of the spectrometer housing. Light from the entrance slit is directed to the cross-disperser grating. The light is directed from the cross-disperser grating to the echelle immersions grating. The light is directed from the echelle immersions grating to the cryogenically cooled detector on the second side of the spectrometer housing.

18 Claims, 4 Drawing Sheets

ECHELLE GRATING MULTI-ORDER IMAGING SPECTROMETER UTILIZING A CATADIOPTRIC LENS

CROSS-REFERENCE TO RELATED APPLICATIONS

The present application claims benefit under 35 U.S.C. §119(e) of U.S. Provisional Patent Application No. 61/382,377 filed Sep. 13, 2010 entitled "Echelle Grating Multi-Order Imaging Spectrometer Utilizing a Catadioptric Design," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to a spectrometer and more particularly to an echelle grating multi-order imaging spectrometer.

2. State of Technology

U.S. Pat. No. 5,717,487 for a compact fast imaging spectrometer, issued Feb. 10, 1998 to Donald W. Davies, and assigned to TRW Inc., provides the state of technology information reproduce below. The disclosure of U.S. Pat. No. 5,717,487 for a compact fast imaging spectrometer, issued Feb. 10, 1998 to Donald W. Davies, and assigned to TRW Inc. is incorporated herein in its entirety for all purposes.

"A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter. In past scientific work, the spectral analyses of a host of known elements, molecules, materials, living plants, gases and the like, has been compiled into a library. That library enables objects and things to be identified solely by the spectrometric analysis of the light reflected therefrom. Thus, as example, by examining the spectral content of light reflected from the distant planets, astronomers identified the constituent elements, such as iron, forming those planets; by examining the spectral content of Gases emitted by factory smokestacks, scientists determine if pollutants are being emitted in violation of law or regulation; by examining the spectral content of land, the environmental engineer is able to determine the botanical fertility of a region and its mineral content, and, with subsequent observations, to determine the change in the environment with time; and by examining the spectral content of light reflected in multiple scans over a geographic region, military personnel identify camouflaged military equipment, separate from plant life, in that geographic region. The foregoing represent but a small number of the many known uses of this useful scientific tool."

U.S. Pat. No. 7,016,037 for an imaging spectrometer utilizing immersed gratings with accessible entrance slit, issued Mar. 21, 2006 to Michael P. Chrisp and Scott A. Lerner, provides the state of technology information reproduced below. The disclosure of U.S. Pat. No. 7,016,037 for an imaging spectrometer utilizing immersed gratings with accessible entrance slit, issued Mar. 21, 2006 to Michael P. Chrisp and Scott A. Lerner is incorporated herein in its entirety for all purposes.

"The present invention provides a compact imaging spectrometer. The spectrometer comprises an entrance slit, a catadioptric lens, a grating, and a detector array. The entrance slit directs light to the catadioptric lens; the mirrored surface in the lens receives the light and reflects the light back out of the lens to the grating. The grating receives the light from the lens and diffracts the light back to another portion of the lens. The lens then transmits and focuses the light onto the detector array. Small size for an imaging spectrometer is extremely important because it determines the requirements for the cryogenic cooling. For example, if the spectrometer is small it can fly in a small UAV. Also, if the spectrometer is small it is person portable. In one embodiment of the compact imaging spectrometer, the spectrometer has a front and a back. The entrance slit is located at or near the font and the detector is located at or near the back. The entrance slit, the mirror, the lens, the grating, and the detector array fit within an envelope located between the front and the back. In one embodiment the envelope is 71 mm long or smaller by 43 mm diameter or smaller."

U.S. Pat. No. 7,609,381 to David Wheeler Warren issued Oct. 27, 2009 for a compact, high-throughput spectrometer apparatus for hyperspectral remote sensing provides the state of technology information reproduce below. The disclosure of U.S. Pat. No. 7,609,381 to David Wheeler Warren issued Oct. 27, 2009 is incorporated herein in its entirety for all purposes.

Hyperspectral imaging is an extremely powerful and broadly applied technique of optical remote sensing. It consists of imaging an object or scene in a multitude of contiguous wavelength intervals. As distinct from multispectral imaging, where the wavelength intervals are typically defined by a relatively small number (e.g., <12) of discrete optical bandpass filters, hyperspectral imaging employs a larger number of finer spectral intervals in order to more reliably detect and discriminate between the unique spectral characteristics of natural and artificial materials.

As a tool of remote sensing, for example in geology or astronomy, hyperspectral imaging is generally practical only in wavelength regions where the earth's atmosphere is transparent over ranges of many kilometers and not affected by absorption from atmospheric constituents such as carbon dioxide and water vapor. These regions include the visible and near-infrared (VNIR: 0.4-1.0 μm), short-wave infrared (SWIR: 1.0-2.5 μm), mid-wave infrared (MWIR: 3.0-5.0 μm), and long-wave infrared (LWIR: 8.0-14.0 μm). Depending on the mission and phenomenology of interest, it is common to divide one of these broad spectral regions into 10 s or 100 s of sampled spectral sub-intervals. Typical numbers range from 32 to 512. These modest spectral resolutions are most practically achieved with spectrometers based on dispersive prism or diffraction grating elements.

In addition to large numerical aperture, spectrometers for hyperspectral remote sensing must have good image quality relative to the size of the detector element. For reliable processing and interpretation of the hyperspectral data, they should also have low image distortions such that the length of the slit image should not change with wavelength (keystone) and the dispersed position of the slit image for a given wavelength should not change with position along the slit (smile). These distortions should be controlled to a small fraction (e.g., <1/10) of a pixel dimension.

Finally, spectrometers intended for aircraft or satellite use, where volume and mass are often highly constrained, must be as compact as possible. This is particularly true of instruments operating at infrared wavelengths, where the entire instrument is cooled to cryogenic temperatures and demands on cooling resources increase dramatically with instrument volume.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a cryogenically cooled imaging spectrometer. The spectrometer includes a spectrometer housing having a first side and a second side opposite the first side. An entrance slit is on the first side of the spectrometer housing and directs light to a cross-disperser grating. An echelle immersions grating and a catadioptric lens are positioned in the housing to receive the light. A cryogenically cooled detector is located in the housing on the second side of the spectrometer housing. Light from the entrance slit is directed to the cross-disperser grating. The light is directed from the cross-disperser grating to the echelle immersions grating. The light is directed from the echelle immersions grating to the cryogenically cooled detector on the second side of the spectrometer housing.

The present invention provides a compact echelle grating spectrometer based on an immersive diffraction grating and a catadioptric lens incorporating a cross-disperser grating. The entrance slit is easily accessible and is at the opposite side the detector, which facilitates the opto-mechanical packaging. This enables a heavier detector substrate, which needs to be at the coldest temperature, to be attached directly to the cooler cold finger. There is also little limitation on the detector substrate size, since the entrance optical beam does not pass by the detector substrate. Applicants have determined that the compact echelle grating spectrometer of the present invention uses fifty times less volume than the prior art spectrometers which do not use a catadioptric lens. This reduces the cryogenic cooling requirements enabling its use in small unmanned aerial vehicles and other aircraft, for man portable instruments, and potentially from space. The compact echelle grating spectrometer of the present invention can be utilized for remote sensing imaging spectrometers where high spectral resolution, size and weight are of primary importance. By utilizing multiple echelle grating orders cross-dispersed over the detector, very high spectral resolution can be obtained, in this case one quarter of a wave number over the mid-wave infrared spectrum. The compact echelle grating spectrometer of the present invention is also applicable to near-infrared and long-wave infrared bands.

The compact echelle grating spectrometer of the present invention uses a smaller vacuum Dewar with a mechanical cryogenic cooler, facilitating its use in aircraft or spacecraft remote sensing applications where volume, weight, and power are severe limitations. Potential uses of the present invention include the U.S. Missile Defense Agency, Strategic Command and Special Operations Command for consequence assessments. The spectrometer of the present invention has use for remote sensing of gases for applications within the scope of the Homeland Security Department. The spectrometer of the present invention can be used for commercial remote sensing where portability is important. The spectrometer of the present invention can be used for pollution detection, and remote sensing of agricultural crops, and geological identification among the various potential applications. The compact echelle grating spectrometer of the present invention can also be used for the remote monitoring of industrial processes and pollution.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
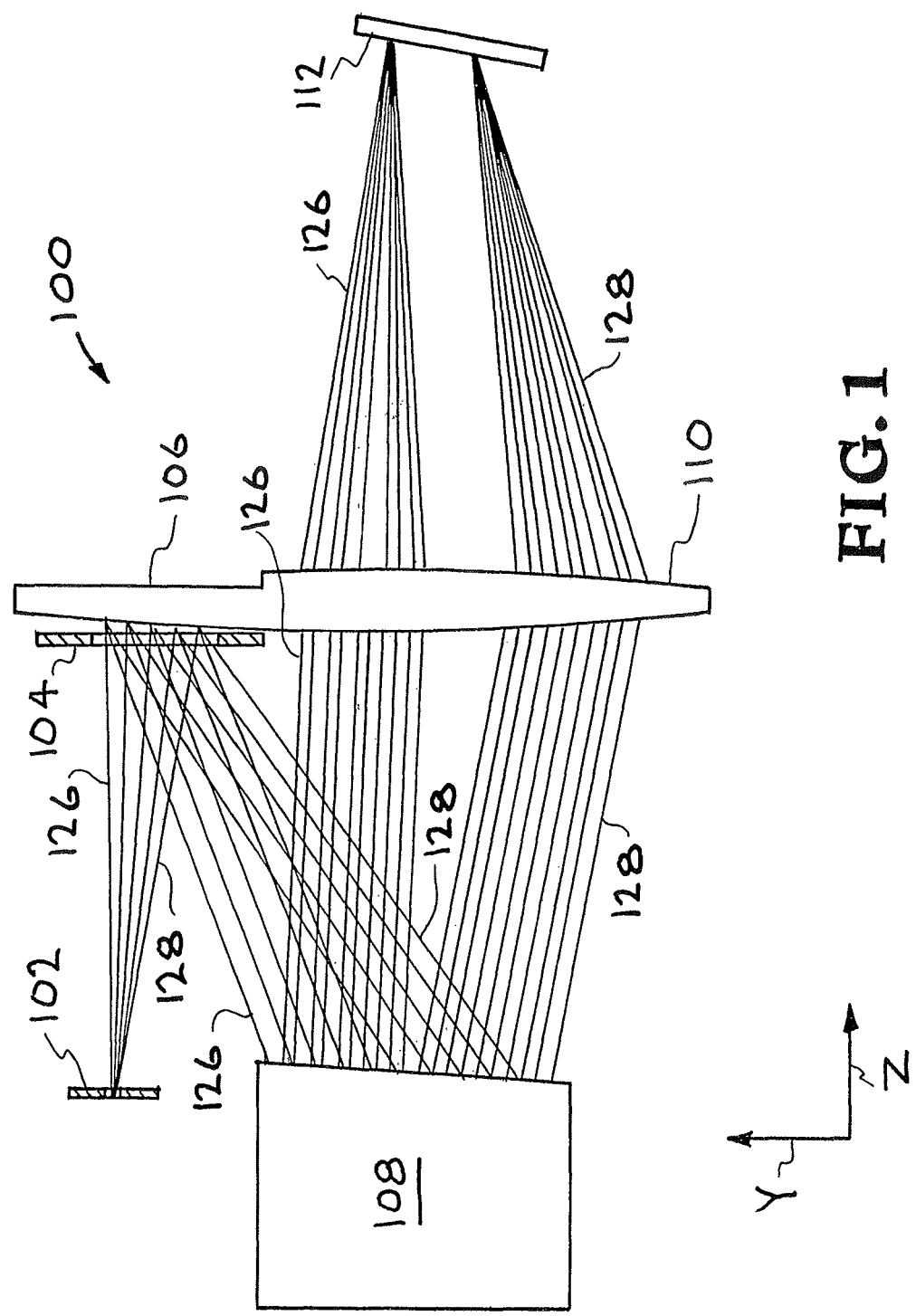
FIG. 1 is a raytrace that illustrate one embodiment of a compact echelle grating imaging spectrometer of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, an embodiment of a compact echelle grating imaging spectrometer constructed in accordance with the present invention is illustrated. FIG. 1 is a raytrace that illustrate the embodiment of the compact echelle grating imaging spectrometer of the present invention. This embodiment is designated generally by the reference numeral 100.

The structural elements of the compact imaging spectrometer 100 include an entrance slit 102, a cold stop 104, a cross-disperser grating 106, an echelle immersions grating 108, a catadioptric lens 110 and a cryogenically cooled detector 112. The entrance slit 102 is vertical in the yz plane and is 9 pixels long. The light goes from the entrance slit 102 to the lens 110 which transmits it to a flat reflective grating cross-disperser 106 cut into the lens 110 surface. The grooves on the cross disperser 106 are parallel to the xz plane, and the grating itself is immersed. The light, dispersed in the y direction in the first order and then goes back through the lens 110 that refracts it to the ruled germanium echelle immersion grating 108. The echelle immersion grating 108 has its grooves parallel to the yx plane. The multiple diffracted orders from the echelle grating 108 propagate back through the lens 110 which focuses the light onto the 2D detector array 110. The cross dispersion ensures that the spectra from the multiple orders are separated on the detector, as shown by the orders in FIG. 1. The germanium echelle grating 108 is a wedged prism that is aspheric on the face and with the grating ruled on the flat reflective side. Baffles are inserted at select locations to meet stray light requirements. The light coming through the entrance slit 102 contains a portion with a first frequency 126 and a portion with a second and different frequency 128. The light with the first frequency 126 and the light with the second and different frequency 128 traveling to cross disperser 106 and echelle immersions grating 108 and catadioptric lens 110 are subject to dispersion which ensures that the spectra from the multiple orders are separated on the detector 112.

The catadioptric lens 110 consists of a rotationally aspheric front surface and an asphere on the back surface. The reflective grating cross-disperser 106 is located on a small section of the lens redirecting and dispersing the light back to the echelle grating 108, thereby allowing the slit and focal plane array to be arranged at opposite ends of the optical system, which provides a practical packaging advantage for a standard focal plane array. The grating cross-disperser 106 can be diamond fly-cut into the flat section of the lens 110 surface.

The cold stop 104 is just in front of the cross disperser 106 on the catadioptric lens 110, shown in FIG. 1. This ensures that the warm back radiation from outside the spectrometer entrance slit 102 does not reach the detector array 112. This would cause an unacceptable degradation in the signal to noise ratio.

The echelle diffraction grating 108 has the rulings immersed into a prism. The grating 108 can be diamond flycut with a blazed profile that will have maximum diffraction efficiency at a desired wavelength. In the spectrometer 100 a conventional echelle grating 108 is used with equally spaced straight grooves on a flat surface. As typical for a high order echelle grating the angle of incidence in germanium is approximately 50 degrees. For the diffraction grating, light enters from the front germanium surface, which has power, and then passes through the germanium to diffract off the grating rulings in multiple orders at the back surface. The diffracted light then propagates through the prism and out. The refractive face of the prism may be spherical or aspherical. For the embodiment of the spectrometer 100 shown in FIG. 1 the diffraction grating is on a flat surface.

The compact imaging spectrometer 100 is diffraction limited over the wavelength range with excellent spatial and spectral resolution. The 9 spatial pixels are vertical (yz plane) on the detector array and the echelle grating disperses in the xz plane. The cross-disperser is designed to leave a few pixels gap between adjacent spectra. The compact imaging spectrometer 100 meets the requirements in Table 1.

TABLE 1

| MWIR Imaging Spectrometer Performance | |
|---|---|
| Spectral Range | 3.2-4.5 microns |
| F-number (square) | 4 |
| Detector array | 256 spatial × 256 spectral |
| Pixel size | 30 microns |
| Spatial input | 9 × 1 pixels |
| Number of spatial pixels on detector assigned to each order | 13 |
| Entrance slit length | 0.27 mm |
| Wavelength resolution | 0.25 wavenumber per pixel |
| Number of pixels along spectrum | 4250 |
| Orders to cover spectral range | ~17 |
| Optical performance | Diffraction limited |

This compact imaging spectrometer 100 is a single diffraction grating imaging spectrometer. This compact imaging spectrometer 100 provides a high spectral resolution system (approximately a factor of 10 greater) in a similar package size. The reduction in volume by at least 2 orders of magnitude compared with prior cross-dispersed echelle grating designs. By using different optical materials the compact imaging spectrometer 100 is adapted to the different spectral regions: visible, near infrared or long wave infrared.

The volume of the prior art designs was approximately 6600 cm$^3$, and used a 1000 watt mechanical refrigeration system that weighed more than 150 pounds The compact echelle grating spectrometer 100 of the present invention has a volume of 400 cm$^3$ which is approx 50 times less than the prior art spectrometer. This is important because a much smaller vacuum vessel and mechanical cryocooler can be used with the compact echelle grating spectrometer 100 of the present invention, resulting in lower weight, power consumption, and heat rejection. In contrast to the prior art spectrometer, an example mechanical cooler that could be useful for this form factor would consume about 200 watts and weigh about 8 pounds.

Figure 2:
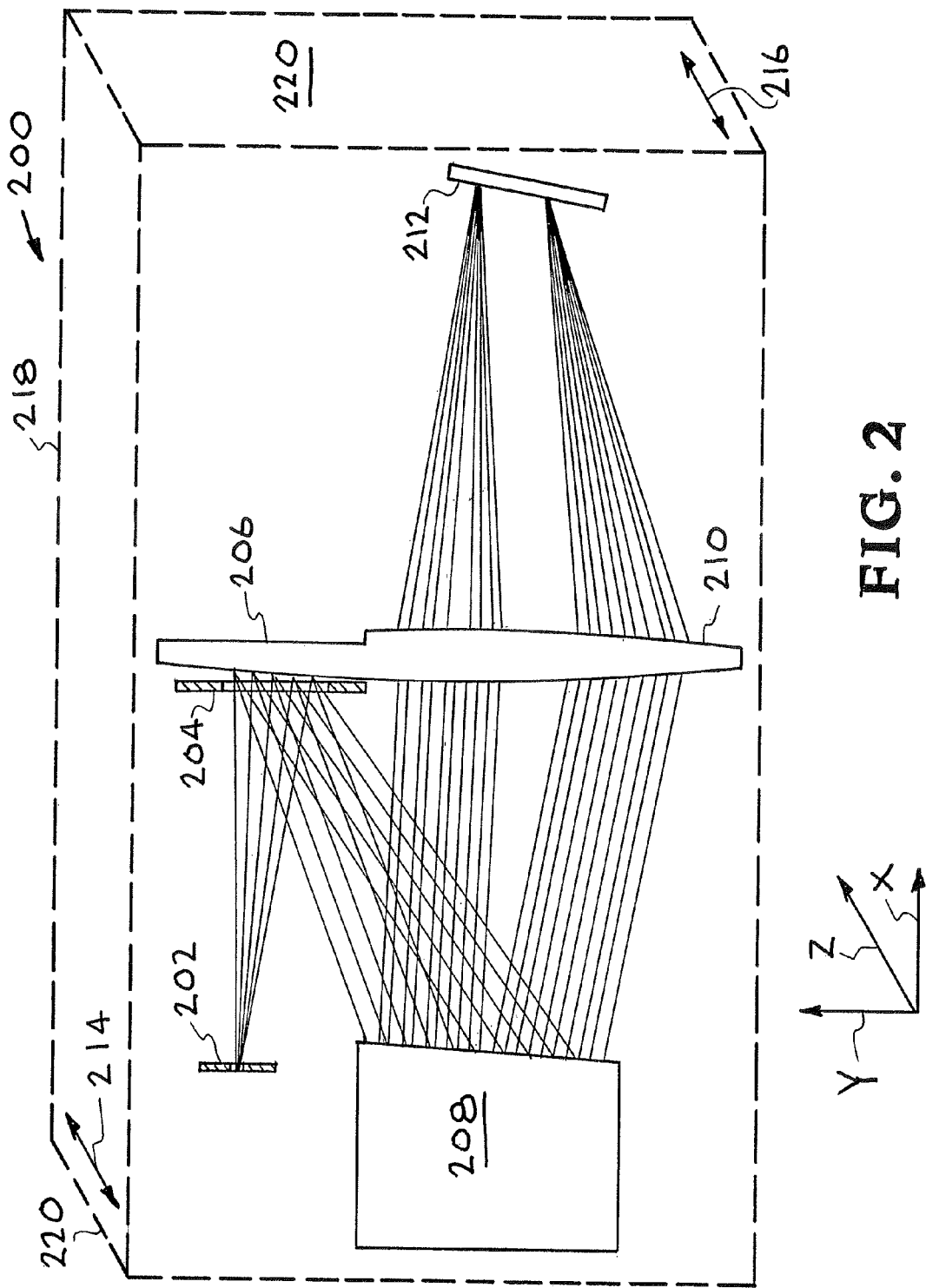
FIG. 2 is a raytrace that illustrate another embodiment of a compact echelle grating imaging spectrometer of the present invention.

Referring now to FIG. 2, another embodiment of a compact echelle grating imaging spectrometer constructed in accordance with the present invention is illustrated. FIG. 2 is a raytrace that illustrate the second embodiment of the compact echelle grating imaging spectrometer of the present invention. This embodiment is designated generally by the reference numeral 200.

The structural elements of the compact imaging spectrometer 200 include X, Y, and Z axes; a first YZ plane 214 in the Y and Z axes; a second YZ plane 216 in the Y and Z axes; a spectrometer housing 218 having a first side and a second side opposite the first side; an entrance slit on the first side of the spectrometer housing for directing light; a cross-disperser grating; a echelle immersions grating; a catadioptric lens; and a cryogenically cooled detector on said second side of said spectrometer housing.

The entrance slit 202 is vertical in the yz plane. The light goes from the entrance slit 202 to the lens 210 which transmits it to a flat reflective grating cross-disperser 206 cut into the lens 210 surface. The light, dispersed in the y direction in the first order and then goes back through the lens 210 that refracts it to the ruled germanium echelle immersion grating 208. The multiple diffracted orders from the echelle grating 208 propagate back through the lens 210 which focuses the light onto the 2D detector array 210. The cold stop 204 is just in front of the cross disperser 206 on the catadioptric lens 210, shown in FIG. 2. This ensures that the warm back radiation from outside the spectrometer entrance slit 202 does not reach the detector array 212. This would cause an unacceptable degradation in the signal to noise ratio.

This compact imaging spectrometer 200 is a single diffraction grating imaging spectrometer. This compact imaging spectrometer 200 provides a high spectral resolution system (approximately a factor of 10 greater) in a similar package size. The reduction in volume by at least 2 orders of magnitude compared with prior cross-dispersed echelle grating designs. By using different optical materials the compact imaging spectrometer 200 is adapted to the different spectral regions: visible, near infrared or long wave infrared.

The volume of the prior art designs was approximately 6600 cm$^3$, and used a 1000 watt mechanical refrigeration system that weighed more than 150 pounds The compact echelle grating spectrometer 200 of the present invention has a volume of ~100 cm$^3$ which is approx 50 times less than the prior art spectrometer. This is important because a much smaller vacuum vessel and mechanical cryocooler can be used with the compact echelle grating spectrometer 200 of the present invention, resulting in lower weight, power consumption, and heat rejection. In contrast to the prior art spectrometer, an example mechanical cooler that could be useful for this form factor would consume about 200 watts and weigh about 8 pounds.

Figure 3:
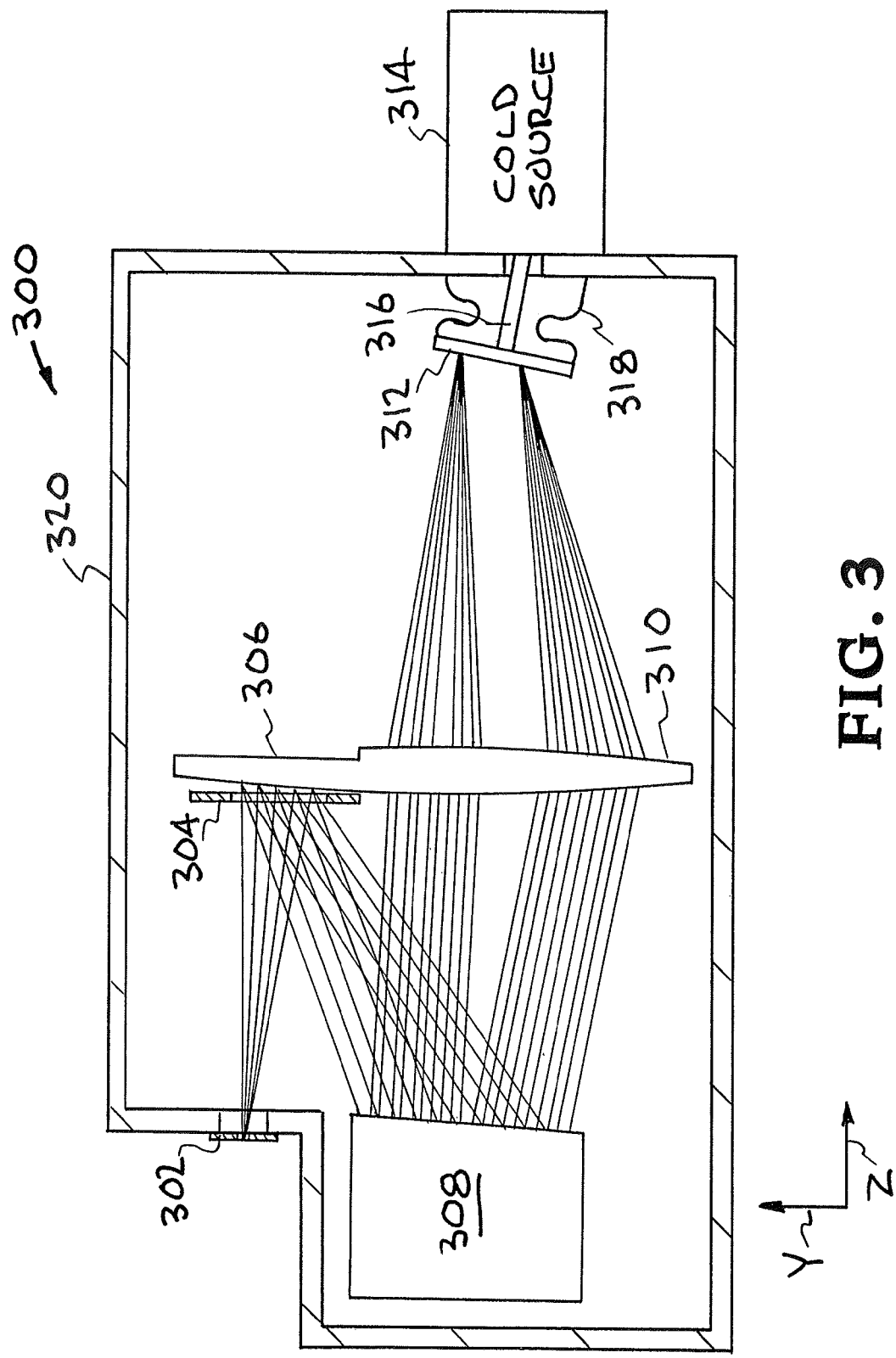
FIG. 3 is a raytrace that illustrate yet another embodiment of a compact echelle grating imaging spectrometer of the present invention.

Referring now to FIG. 3, yet another embodiment of a compact echelle grating imaging spectrometer constructed in accordance with the present invention is illustrated. FIG. 3 is a raytrace that illustrate the third embodiment of the compact echelle grating imaging spectrometer of the present invention. This embodiment is designated generally by the reference numeral 300.

The structural elements of the compact imaging spectrometer 300 include a spectrometer housing 320; an entrance slit 302 on the side of the spectrometer housing for directing light; a cross-disperser grating 306; a echelle immersions grating 308; a catadioptric lens 310; and a cryogenically cooled detector 312 on the side of the spectrometer housing; a cold source 314; a cold finger 316; and a mounting system 318. The spectrometer housing 320 can be a Dewar housing or other thermally insulating housing. The cold source 314 can be a cryogenic cooler or other cooling device.

The entrance slit 302 is vertical in the yz plane. The light goes from the entrance slit 302 to the lens 310 which transmits it to a flat reflective grating cross-disperser 306 cut into the lens 310 surface. The light, dispersed in the y direction in the first order and then goes back through the lens 310 that refracts it to the ruled germanium echelle immersion grating 308. The multiple diffracted orders from the echelle grating 308 propagate back through the lens 310 which focuses the light onto the 2D detector array 310. The cold stop 304 is just in front of the cross disperser 306 on the catadioptric lens 310, shown in FIG. 3.

Figure 4:
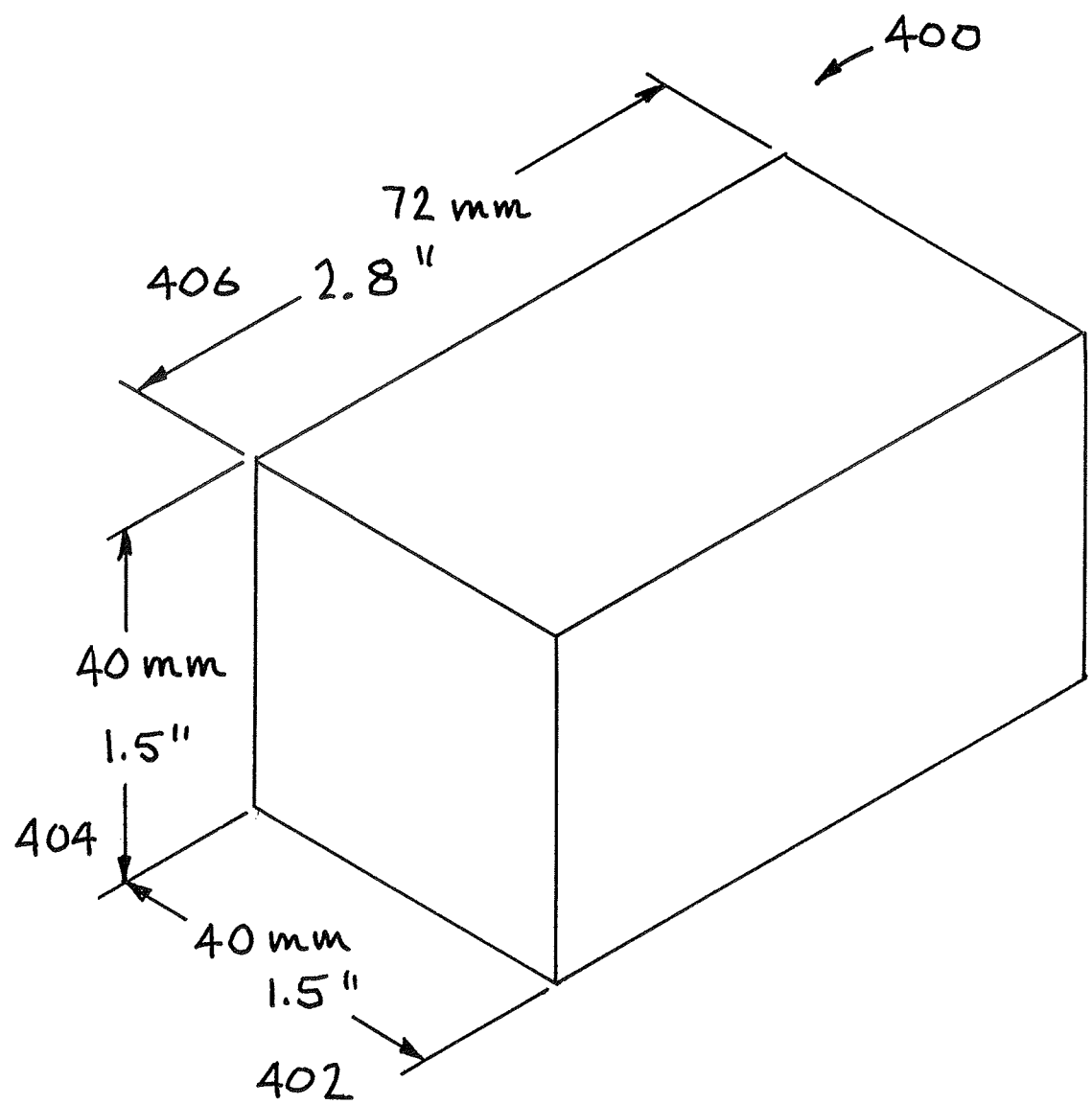
FIG. 4 is an illustration that demonstrates the small size of the a compact echelle grating imaging spectrometer of the present invention.

Referring now to FIG. 4, the small size of the compact echelle grating imaging spectrometer constructed in accordance with the present invention is illustrated. The spectrometer is designated generally by the reference numeral 400. This compact imaging spectrometer 400 provides a high spectral resolution system (approximately a factor of 10 greater) in a similar package size. The reduction in volume by at least 2 orders of magnitude compared with prior cross-dispersed echelle grating designs. By using different optical materials the compact imaging spectrometer 400 is adapted to the different spectral regions: visible, near infrared or long wave infrared. The small size of the compact echelle grating imaging spectrometer 400 is contained in a package that has a width 402 of 40 mm or 1.5 inches, a height 404 of 40 mm or 1.5 inches, and a length of 72 mm or 2.8 inches.

The volume of the prior art designs was approximately 6600 cm$^3$, and used a 1000 watt mechanical refrigeration system that weighed more than 150 pounds The compact echelle grating spectrometer 400 of the present invention has a volume of ~100 cm$^3$ which is approx 50 times less than the prior art spectrometer. This is important because a much smaller vacuum vessel and mechanical cryocooler can be used with the compact echelle grating spectrometer 400 of the present invention, resulting in lower weight, power consumption, and heat rejection. In contrast to the prior art spectrometer, an example mechanical cooler that could be useful for this form factor would consume about 200 watts and weigh about 8 pounds.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A cryogenically cooled imaging spectrometer apparatus, comprising:
   a spectrometer housing having a first side and a second side opposite said first side,
   an entrance slit on said first side of said spectrometer housing for directing light,
   a cross-disperser grating,
   a echelle immersions grating,
   a catadioptric lens, and
   a cryogenically cooled detector on said second side of said spectrometer housing,
   wherein said light from said entrance slit is directed to said cross-disperser grating,
   wherein said light is directed from said cross-disperser grating to said echelle immersions grating, and
   wherein said light is directed from said echelle immersions grating through said catadioptric lens to said cryogenically cooled detector on said second side of said spectrometer housing.

2. The cryogenically cooled imaging spectrometer apparatus of claim 1 including a cold stop between said entrance slit and said cross-disperser grating.

3. The cryogenically cooled imaging spectrometer apparatus of claim 1 wherein said cross-disperser grating is a flat reflective grating cross-disperser cut into a lens surface of the catadioptric lens.

4. The cryogenically cooled imaging spectrometer apparatus of claim 1 wherein said echelle immersions grating is a ruled germanium echelle immersion gating.

5. The cryogenically cooled imaging spectrometer apparatus of claim 1 wherein said echelle immersions grating is a germanium echelle grating having a wedged prism with a face and a flat reflective side and wherein said wedged prism is aspheric on said face and with said grating ruled on said flat reflective side of said wedged prism.

6. The cryogenically cooled imaging spectrometer apparatus of claim 1 including a cold source and a cold finger and wherein said cryogenically cooled detector is connected to said cold finger.

7. The cryogenically cooled imaging spectrometer apparatus of claim 1 wherein said light from said entrance slit includes a first portion with a first frequency and a second portion with a second and different frequency and wherein said first portion with a first frequency and said second portion with a second and different frequency are subject to dispersion.

8. A cryogenically cooled imaging spectrometer apparatus having X, Y, and Z axes, comprising:
a spectrometer housing having a first YZ plane in the Y and Z axes, a first side in said first YZ plane, a second YZ plane in the Y and Z axes, and a second side in said second YZ plane, opposite said first side,
an entrance slit on said first side of said spectrometer housing for directing light,
a cross-disperser grating,
a echelle immersions grating,
a catadioptric lens,
and
a cryogenically cooled detector on said second side of said spectrometer housing,
wherein said light from said entrance slit is directed to said cross-disperser grating,
wherein said light is directed from said cross-disperser grating to said echelle immersions grating, and
wherein said light is directed from said echelle immersions grating through said catadioptric lens to said cryogenically cooled detector on said second side of said spectrometer housing.

9. The cryogenically cooled imaging spectrometer apparatus of claim 8 including a cold stop between said entrance slit and said cross-disperser grating.

10. The cryogenically cooled imaging spectrometer apparatus of claim 8 wherein said cross-disperser grating is a flat reflective grating cross-disperser cut into a lens surface of the catadioptric lens.

11. The cryogenically cooled imaging spectrometer apparatus of claim 8 wherein said echelle immersions grating is a ruled germanium echelle immersion grating.

12. The cryogenically cooled imaging spectrometer apparatus of claim 8 wherein said echelle immersions grating is a germanium echelle grating having a wedged prism with a face and a flat reflective side, and wherein said wedged prism is aspheric on said face and with said grating ruled on said flat reflective side of said wedged prism.

13. The cryogenically cooled imaging spectrometer apparatus of claim 8 including a cold source and a cold finger and wherein said cryogenically cooled detector is connected to said cold finger.

14. A cryogenically cooled imaging spectrometer apparatus having X, Y, and Z axes, comprising:
a spectrometer housing having a first YZ plane in the Y and Z axes, a first side in said first YZ plane, a second YZ plane in the Y and Z axes, and a second side in said second YZ plane, opposite said first side,
an entrance slit on said first side of said spectrometer housing for directing light,
a cross-disperser grating,
a cold stop between said entrance slit and said cross-disperser grating,
a echelle immersions grating,
a catadioptric lens,
a cryogenically cooled detector on said second side of said spectrometer housing,
a cold source, and
a cold finger,
wherein said cryogenically cooled detector is connected to said cold finger,
wherein said light from said entrance slit is directed through said cold stop to said cross-disperser grating,
wherein said light is directed from said cross-disperser grating to said echelle immersions grating, and
wherein said light is directed from said echelle immersions grating through said catadioptric lens to said cryogenically cooled detector on said second side of said spectrometer housing.

15. The cryogenically cooled imaging spectrometer apparatus of claim 14 wherein said cross-disperser grating is a flat reflective grating cross-disperser cut into a lens surface of the catadioptric lens.

16. The cryogenically cooled imaging spectrometer apparatus of claim 14 wherein said echelle immersions grating is a ruled germanium echelle immersion grating.

17. The cryogenically cooled imaging spectrometer apparatus of claim 14 wherein said echelle immersions grating is a germanium echelle grating having a wedged prism with a face and a flat reflective side, and wherein said wedged prism is aspheric on said face and with said grating ruled on said flat reflective side of said wedged prism.

18. The cryogenically cooled imaging spectrometer apparatus of claim 14 including a cold source and a cold finger and wherein said cryogenically cooled detector is connected to said cold finger.

\* \* \* \* \*